United States Patent
Ferguson (10) Patent No.: US 11,833,921 B2
(45) Date of Patent: Dec. 5, 2023

(54) BATTERY ASSESSMENT FOR ELECTRIC VEHICLE FLEET

(71) Applicant: GM Cruise Holdings LLC, San Francisco, CA (US)

(72) Inventor: Kenneth Ramon Ferguson, Scottsdale, AZ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 423 days.

(21) Appl. No.: 17/082,550

(22) Filed: Oct. 28, 2020

(65) Prior Publication Data
US 2022/0126723 A1 Apr. 28, 2022

(51) Int. Cl.
*B60L 53/65* (2019.01)
*B60L 53/14* (2019.01)
*B60L 3/00* (2019.01)

(52) U.S. Cl.
CPC .......... *B60L 53/65* (2019.02); *B60L 3/0046* (2013.01); *B60L 53/14* (2019.02)

(58) Field of Classification Search
CPC ......... B60L 53/65; B60L 53/14; B60L 3/0046
See application file for complete search history.

(56) References Cited

U.S. PATENT DOCUMENTS

| | | | |
|---|---|---|---|
| 8,738,309 B2 * | 5/2014 | Bertness | B60L 58/18 320/112 |
| 10,288,693 B2 | 5/2019 | Baker et al. | |
| 10,345,384 B2 | 7/2019 | Christophersen et al. | |
| 10,379,533 B2 * | 8/2019 | Bier | G05D 1/0016 |
| 11,513,160 B2 * | 11/2022 | Salo, III | G07C 5/0841 |
| 2007/0239374 A1 * | 10/2007 | Dougherty | G01R 31/392 702/63 |
| 2008/0315830 A1 * | 12/2008 | Bertness | H02J 7/1446 320/104 |
| 2019/0308520 A1 * | 10/2019 | Ward | G01C 21/34 |

OTHER PUBLICATIONS

Wu, Y., et al., "Ultrasonic Health Monitoring of Lithium-Ion Batteries," Electronics; pp. 1-16 (published Jul. 3, 2019).
Zhang, Y., et al., "Identifying Degradation Patterns of Lithium Ion Batteries from Impedance Spectroscopy Using Machine Learning," Nature Communications; 6 pages (2020).

* cited by examiner

*Primary Examiner* — Gertrude Arthur Jeanglaude
(74) *Attorney, Agent, or Firm* — Akona IP PC (57) ABSTRACT

A battery assessment station for an electric vehicle (EV) battery includes an impedance spectroscopy device that applies an electrical signal at a set of frequencies and measures the impedance response of the battery. A battery analyzer determines a battery parameter, such as remaining useful life or state-of-health, based on the impedance response. A fleet management system manages a fleet of EVs according to their determined battery parameters. For example, the fleet management system applies operational rules regarding the use or charging of the EVs in order to respond to battery degradation and improve battery life.

20 Claims, 4 Drawing Sheets

BATTERY ASSESSMENT FOR ELECTRIC VEHICLE FLEET

TECHNICAL FIELD OF THE DISCLOSURE

The present disclosure relates generally to battery-powered electric vehicles and, more specifically, to systems and methods for assessing battery health of electric vehicles in a fleet and modifying fleet operation based on battery health.

BACKGROUND

Electric vehicles (EVs) are powered by batteries that need to be periodically charged. Batteries degrade with use, with various mechanisms contributing to the degradation, such as lithium plating, solid electrolyte interphase (SEI) layer growth, and active material loss. Over time, a battery's capacity decreases, lowering the range of the EV. In addition, degradation increases the likelihood that the battery fails during operation, e.g., through rapid capacity degradation.

Current methods for assessing state-of-health (SoH) and remaining useful life of EV batteries include Coulomb counting and on-board battery measurements. Coulomb counting involves fully charging and discharging the battery while measuring the current input and output. A slow rate of charge is used to obtain accurate results, and after the process is complete, the battery must be recharged before the EV can be used again. The Coulomb counting process removes the EV from service for many hours, which is undesirable for fleet operations. In addition, the charge cycle used to perform Coulomb counting is itself degrading to the battery, so performing Coulomb counting with any regularity can negatively impact a battery's lifespan. Furthermore, while Coulomb counting provides an accurate measurement of a battery's current capacity, it does not suggest a cause of battery degradation, so it is difficult to make fleet planning decisions based on Coulomb counting results. On-board measurements, such as measurements of voltage, current, and resistance during operation of the EV, can provide some insight into battery health. However, existing on-board measurement techniques do not provide accurate measurements of a battery's capacity.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Battery assessment stations using impedance spectroscopy obtain measurements that can be used to determine an EV battery's state-of-health and estimate the battery's remaining useful life. An impedance spectroscopy measurement device supplies an electrical stimulus (e.g., a current or a voltage signal) at multiple frequencies to the battery and measures an impedance response. The impedance spectroscopy measurements can be obtained in a much shorter amount of time than the Coulomb counting process, e.g., in several minutes for impedance spectroscopy as opposed to many hours for Coulomb counting. In addition, impedance spectroscopy can be performed without performing a charge-discharge cycle that degrades the battery.

Impedance spectroscopy measurements are compared to a data set obtained from many vehicles across a vehicle fleet to obtain parameters describing battery health. For example, the impedance spectroscopy measurements can be compared to a historical data set to determine parameters describing current battery capacity and estimated remaining useful life of the battery. In some embodiments, the impedance spectroscopy measurements are used to identify one or more different conditions leading to battery degradation. The historical data set can be obtained using a fleet of EVs and can be used to train a machine-learned model that predicts battery capacity, remaining useful life, and other parameters or conditions based on impedance spectroscopy measurements.

A fleet management system can use the battery health data obtained using the impedance spectroscopy measurements to manage battery use across the fleet, extend useful life of batteries in the fleet, and plan for battery replacements across the fleet. For example, the fleet management system can set one or more operational rules for an EV battery limiting the usage and/or charging of the battery based on the battery health. As another example, the fleet management system may adjust route assignments based on the estimated battery capacity. In some examples, the fleet management system determines a cause of battery degradation (e.g., lithium plating) and sets an operational rule for the battery or the EV based on the cause (e.g., not charging the battery above 80% capacity).

Embodiments of the present disclosure provide a system for assessing battery health of a battery-powered EV that includes a battery analyzer, a battery planning module, and a vehicle manager. The battery analyzer is configured to receive data generated by an impedance spectroscopy device at a battery assessment station and determine at least one parameter describing the battery based on the received data, the at least one parameter determined using a machine-learned model trained using battery assessment data obtained from a plurality of EV batteries. The battery planning module is configured to set an operational rule for the EV based on the at least one parameter determined by the battery analyzer. The vehicle manager is configured to instruct the EV to perform autonomous driving tasks, the vehicle manager configured to instruct the EV according to the operational rule.

Further embodiments of the present disclosure provide a system for assessing battery health of a battery-powered EV that includes a plurality of battery assessment stations and a fleet management system. Each battery assessment station includes a battery connection configured to electrically couple the battery assessment station to the battery of the EV, a stimulus generator configured to apply an electrical stimulus to the battery of the EV through the battery connection, an impedance sensor configured to measure an impedance response of the battery to the electrical stimulus, and communications circuitry configured to transmit data based on the measured impedance response. The fleet management system is configured to instruct the EV to autonomously maneuver to a selected one of the plurality of battery assessment stations for battery assessment; receive, from the selected battery assessment station, data based on the measured impedance response of the battery; and set an operational rule for the EV based on the data.

Further embodiments of the present disclosure provide a method for assessing an EV battery and adjusting operation of the EV that includes receiving data generated by an impedance spectroscopy device at a battery assessment station, the data describing an impedance response of the battery to an electrical stimulus; determining at least one parameter describing the battery based on the received data, the at least one parameter determined using a machine-learned model trained using battery assessment data obtained from a plurality of EV batteries; setting an operational rule for the EV based on the at least one parameter; and instructing the EV to perform an autonomous driving according to the operational rule.

As will be appreciated by one skilled in the art, aspects of the present disclosure, in particular aspects of battery assessment of an electric vehicle fleet, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example EV Battery Assessment System

Figure 1:
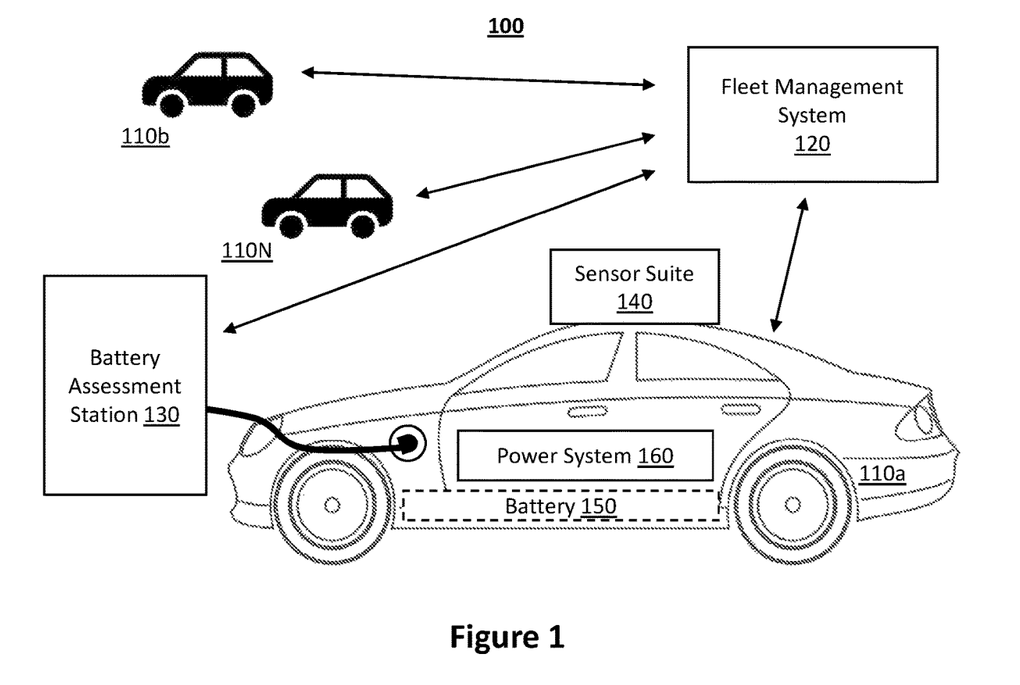
FIG. 1 is a block diagram illustrating an example EV battery assessment system according to some embodiments of the present disclosure.

FIG. 1 is a block diagram illustrating an example EV battery assessment system 100 according to some embodiments of the present disclosure. The system 100 includes a fleet of electric vehicles (EVs) 110, including EV 110a, EV 110b, and EV 110N, a fleet management system 120, and a battery assessment station 130. For example, a fleet of EVs may include a number N of EVs, e.g., EV 110a through EV 110N. Some or all of the EVs 110 may be autonomous vehicles (AVs). EV 110a includes a sensor suite 140, a battery 150, and a power system 160. EVs 110b through 110N also include the sensor suite 140, battery 150, and power system 160. A single EV in the fleet is referred to herein as EV 110, and the fleet of EVs is referred to collectively as EVs 110.

The EV 110a is connected to a battery assessment station 130. The system 100 may include multiple similar battery assessment stations 130 for assessing batteries of the EVs 110. The battery assessment station 130 obtains measurements of the battery 150 that can be used to determine the state-of-health (SoH) of the battery 150 (e.g., the ratio of maximum deliverable capacity to initial capacity), the remaining useful life (RUH) of the battery 150, or other characteristics of the battery 150. In particular, the battery assessment station 130 obtains impedance spectroscopy measurements by applying an electrical stimulus across a set of frequencies to the battery 150 and measuring the impedance response of the battery 150 to the stimulus. The battery assessment station 130 transmits the measurements of the battery 150 and/or one or more parameters derived from the measurements to the fleet management system 120. The fleet management system 120 may control the EV 110a based on the measurements from the battery assessment station 130, such as adjusting battery usage, charging rates, or charge level bounds, to increase the useful life of the battery. In addition, the fleet management system 120 can schedule the battery 150 for replacement or plan for when the battery 150 is expected to need replacing in the future.

In some embodiments, each EV 110 is a fully autonomous electric automobile. In other embodiments, each EV 110 may additionally or alternatively be another semi-autonomous or fully autonomous vehicle; e.g., a boat, an unmanned aerial vehicle, a driverless car, etc. Additionally, or alternatively, the EV 110 may be a vehicle that switches between a semi-autonomous state and a fully autonomous state and thus, the EV may have attributes of both a semi-autonomous vehicle and a fully autonomous vehicle depending on the state of the vehicle. In some embodiments, some or all of the EVs 110 are non-autonomous electric vehicles.

In embodiments where the EVs 110 are autonomous, each EV 110 may include a throttle interface that controls an engine throttle, motor speed (e.g., rotational speed of electric motor), or any other movement-enabling mechanism; a brake interface that controls brakes of the EV (or any other movement-retarding mechanism); and a steering interface that controls steering of the EV (e.g., by changing the angle of wheels of the EV). The EV 110 may additionally or alternatively include interfaces for control of any other vehicle functions; e.g., windshield wipers, headlights, turn indicators, air conditioning, etc.

The EV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the EV 110.

An onboard computer (not shown in FIG. 1) is connected to the sensor suite 140 and functions to control the EV 110 and to process sensed data from the sensor suite 140 and/or other sensors in order to determine the state of the EV 110. Based upon the vehicle state and programmed instructions, the onboard computer modifies or controls behavior of the EV 110. The onboard computer is preferably a general-purpose computer adapted for I/O communication with vehicle control systems and sensor suite 140, but may additionally or alternatively be any suitable computing device. The onboard computer is preferably connected to the Internet via a wireless connection (e.g., via a cellular data connection). Additionally or alternatively, the onboard computer may be coupled to any number of wireless or wired communication systems.

The battery 150 is a rechargeable battery that powers the EV 110. The battery 150 may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the EV 110 is a hybrid electric vehicle that also includes an internal combustion engine for powering the EV 110, e.g., when the battery 150 has low charge.

The power system 160 controls the charging and operation of the battery 150 and the delivery of charge to other components of the EV 110. The power system 160 may include battery sensors for determining a current charge level of the battery 150 or other on-board battery measurements. The power system 160 may interface with a charging station to initiate charging, request charge at a selected charging rate, and end a charging session. In some embodiments, the power system 160 controls charging and/or discharging of the battery 150 based on instructions received from the fleet management system 120, e.g., instructions to charge the battery 150 up to a particular charge bound (e.g., 80% of a full charge), instructions to charge the battery 150 at a certain rate or below a particular charging rate, instructions to discharge the battery at a certain rate or below a particular discharge rate, or other instructions related to battery usage.

In some embodiments, the EV 110 includes multiple batteries 150, e.g., a first battery used to power vehicle propulsion, and a second battery used to power AV hardware (e.g., the sensor suite 140 and the onboard computer). In such embodiments, the power system 160 may manage charging and power draw from multiple batteries, e.g., by dividing received power between the two batteries. The power system 160 may route signals from and to the battery assessment station 130 to different batteries, so that the battery assessment station 130 may independently assess each battery. The power system 160 may include an on-board charger that converts alternating current (AC) to direct current (DC). The on-board charger is used when the EV 110 is charged by a charging station that delivers AC; if the charging station delivers DC, the on-board charger is bypassed. The on-board charger may be bypassed during battery assessment.

The fleet management system 120 manages the fleet of EVs 110. The fleet management system 120 may manage a service that provides or uses the EVs 110, e.g., a service for providing rides to users with the EVs 110, or a service that delivers items using the EVs (e.g., prepared foods, groceries, packages, etc.). The fleet management system 120 may select an EV from the fleet of EVs 110 to perform a particular service or other task, and instruct the selected EV (e.g., EV 110a) to autonomously drive to a particular location (e.g., a delivery address). The fleet management system 120 also manages fleet maintenance tasks, such as servicing and charging of the EVs 110. As shown in FIG. 1, each of the EVs 110 communicates with the fleet management system 120. The EVs 110 and fleet management system 120 may connect over a public network, such as the Internet. The fleet management system 120 is described further in relation to FIG. 2.

The battery assessment station 130 performs assessment of batteries of EVs 110. The battery assessment station 130 shown in FIG. 1 has a cord and a plug; the plug is plugged into a socket of the EV 110a, which may be the same socket that is used for charging the battery 150 of the EV 110a. The battery assessment station 130 applies an electrical stimulus to the battery 150 through the cord and plug, and the battery assessment station 130 measures an impedance response of the battery 150 to the stimulus. The electrical stimulus may be a voltage or a current that is applied at a range of frequencies, and the battery assessment station 130 measures the impedance response of the battery 150 at each of the applied frequencies. The fleet management system 120 may determine one or more selected frequencies that generate measurements indicative of battery capacity and health and instruct the battery assessment station 130 to measure the impedance response to the selected frequencies.

The battery assessment station 130 may communicate with the fleet management system 120, e.g., over the Internet. The battery assessment station 130 may receive instructions from the fleet management system 120 and transmit measurements and/or parameters derived from the measurements to the fleet management system 120. In other embodiments, the battery assessment station 130 communicates with the fleet management system 120 via the EV 110, e.g., the battery assessment station 130 transmits battery assessment data to the EV 110 through a wired connection (e.g., through the cord and plug shown in FIG. 1) or a wireless connection (e.g., Bluetooth or WiFi), and the EV 110 transmits the battery assessment data to the fleet management system 120.

The fleet management system 120 may operate a network of battery assessment stations similar to the battery assessment station 130. Battery assessment stations in the network may be distributed across one or more geographic regions in which the fleet of EVs 110 provides service. Battery assessment stations may be included in EV facilities operated by the fleet management system 120, e.g., facilities for storing, charging, and/or maintaining EVs. In some embodiments, the battery assessment station 130 is a component of a charging station for charging EV batteries. The charging station may be an AC charger or a DC charger. A combined battery assessment and charging station may perform battery assessment before recharging the battery 150, after recharging the battery 150, at other points in the recharging process, or multiple times before, during, or after the recharging process. Performing battery assessment on a fully discharged or fully charged battery may provide the most accurate results.

Example Battery Assessment Station

Figure 2:
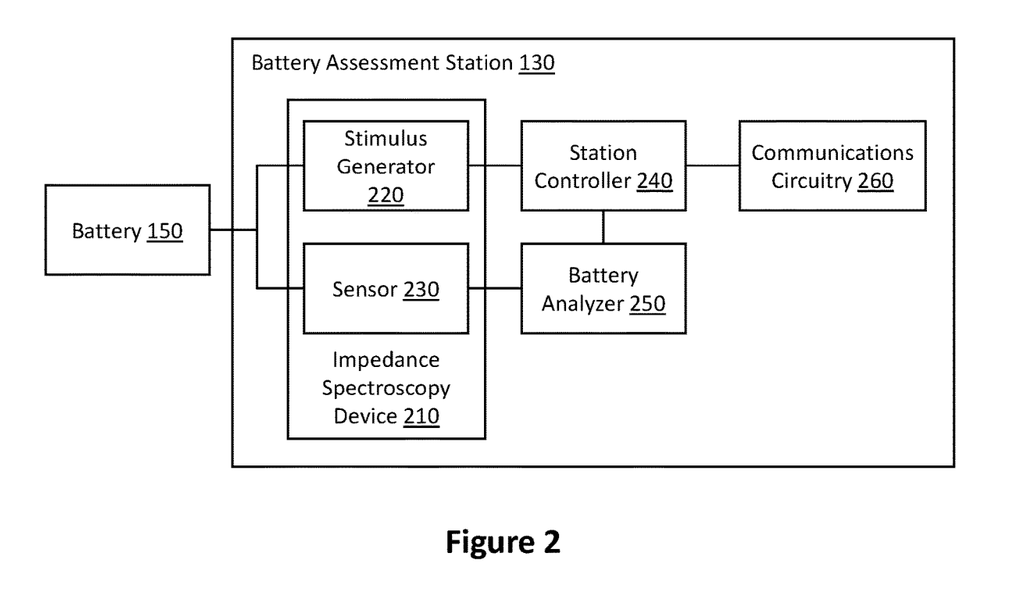
FIG. 2 is a block diagram illustrating an example battery assessment station according to some embodiments of the present disclosure.

FIG. 2 is a block diagram illustrating the battery assessment station 130 according to some embodiments of the present disclosure. The battery assessment station 130 includes an impedance spectroscopy device 210 that is connected to the battery 150 of the EV 110. The impedance spectroscopy device 210 includes a stimulus generator 220 and a sensor 230. The battery assessment station 130 further includes a station controller 240, a battery analyzer 250, and communications circuitry 260. In alternative configurations, different and/or additional components may be included in the battery assessment station 130. Further, functionality attributed to one component of the battery assessment station 130 may be accomplished by a different component included in the battery assessment station 130 or a different system than those illustrated.

The impedance spectroscopy device 210 includes a stimulus generator 220 and a sensor 230. The stimulus generator 220 is configured to generate an electrical stimulus signal that is applied to the battery 150 through the cord and plug as described with respect to FIG. 1. The stimulus generator 220 may be a voltage generator or a current generator. The electrical stimulus signal generated by the stimulus generator 220 is an alternating signal (i.e., an alternating current or an alternating voltage) and the stimulus generator 220 can vary the frequency of the alternating signal. In some embodiments, the stimulus generator 220 may also vary the current and/or potential of the electrical stimulus signal, or other characteristics.

The sensor 230 senses an electrical response of the battery 150 to the electrical stimulus signal. For example, if the stimulus generator 220 generates a voltage signal, the sensor 230 measures the current response of the battery 150 to the voltage signal. If the stimulus generator 220 generates a current signal, the sensor measures a voltage response of the battery 150 to the current signal. The electrical response of the battery 150 at different stimulus frequencies provides rich information about the material properties of the battery 150, including interfacial phenomena and electrochemical reactions that have occurred within the battery 150 and may be sources of degradation.

The station controller 240 controls the impedance spectroscopy device 210. In particular, the station controller 240 instructs the stimulus generator 220 to apply the electrical stimulus signal. The station controller 240 may instruct the stimulus generator 220 to generate the electrical stimulus signal with a particular frequency, a particular set of frequencies, or across a range of frequencies. The frequency or frequencies may be selected by a battery health system at the fleet management system 120, as described further in relation to FIG. 5. The station controller 240 is further connected to a battery analyzer 250 that receives measurements from the sensor 230. In some embodiments, the station controller 240 instructs the sensor 230 to collect measurement data and pass the measurement data to the battery analyzer 250. In other embodiments, the battery analyzer 250 requests measurement data from the sensor 230 when the station controller 240 indicates to the battery analyzer 250 that the electrical stimulus signal is being applied by the stimulus generator 220.

The battery analyzer 250 receives sensor data from the sensor 230. The sensor data may be in the form of voltage or current measurements, as described above. Alternatively, the sensor 230 may perform pre-processing of the voltage or current measurements, e.g., to generate impedance measurements for the battery 150. The battery analyzer 250 processes the data received from the sensor 230, e.g., to calculate a battery parameter or set of parameters that describe the battery 150. Battery parameters may characterize the response of the battery 150 to the stimulus signal, e.g., the parameters may include impedance measurements at different stimulus frequencies. Battery parameters may alternately or additionally include parameters describing battery characteristics, such as battery capacity, remaining useful life, SoH, time to reach a full charge, etc. The battery analyzer 250 may store a machine-learned battery model that is trained to calculate one or more battery parameters from the sensor data. An example of the battery model is described with respect to FIG. 5.

The battery analyzer 250 passes the battery parameters to the station controller 240, which passes the battery parameters to the communications circuitry 260. The communications circuitry 260 transmits information, such as the battery parameters, to the fleet management system 120. The communications circuitry 260 may also receive information, such as software updates or instructions for the station controller 240 and/or the battery analyzer 250, from the fleet management system 120.

It should be understood that the battery assessment station 130, and in particular, the battery analyzer 250, may perform various degrees of data processing in different embodiments. In some examples, the battery assessment station 130 provides the raw measurements (e.g., voltage, current, or impedance measurements) from the sensor 230 to the fleet management system 120. The raw measurements can be valuable for training a battery model. In some cases, the hardware of the battery assessment station 130 may not be configured to perform data processing, and the raw measurements are offloaded to the fleet management system 120 even after the battery model is trained. In other cases, the fleet management system 120 may transmit a battery model or data pre-processing instructions to the battery assessment station 130, and the battery assessment station 130 calculates battery parameters based on the raw sensor data according to the battery model or other instructions. This can minimize the amount of data transmitted from the battery assessment station 130 to the fleet management system 120.

Example Set of Battery Assessment Tools

Figure 3:
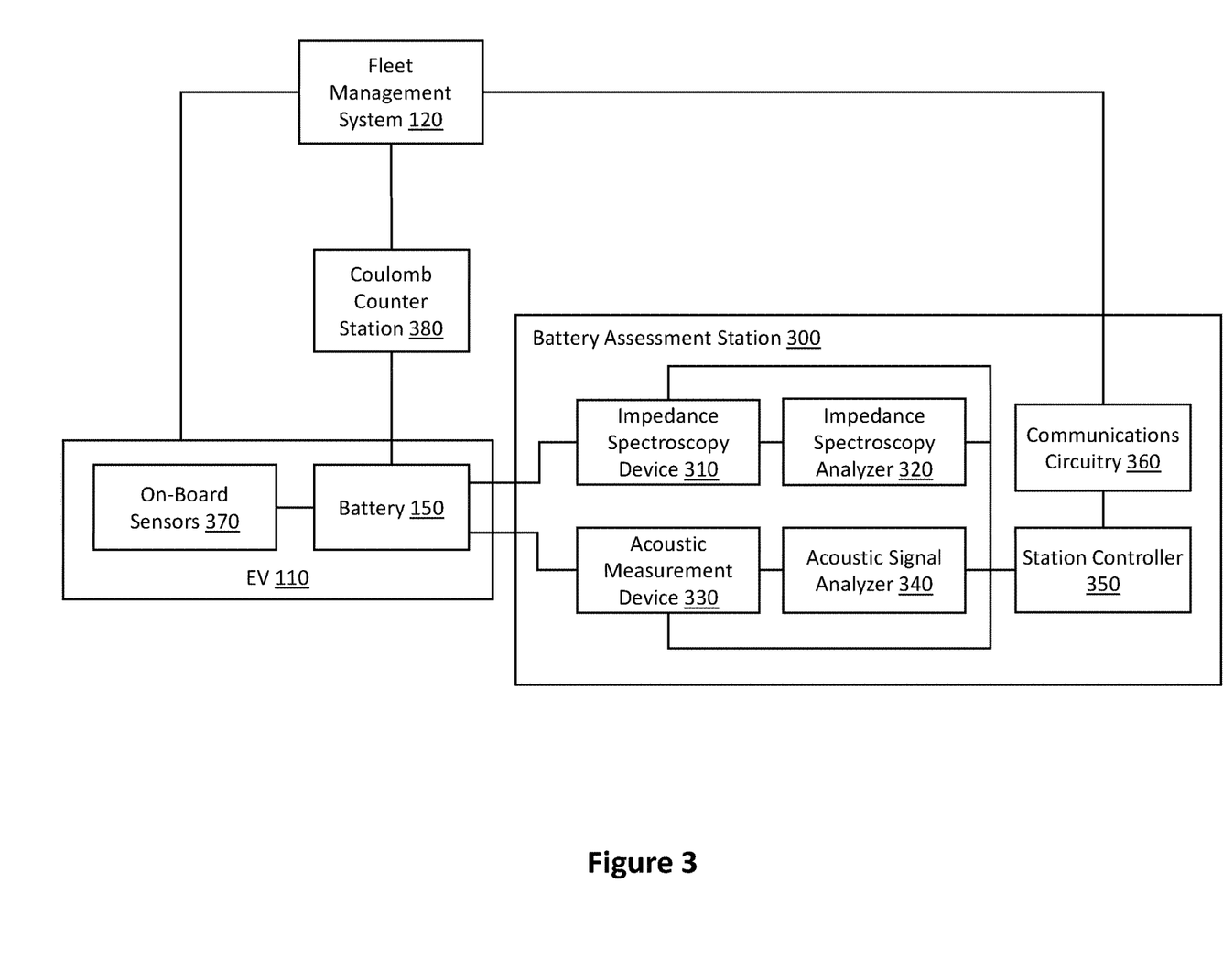
FIG. 3 is a block diagram illustrating a set of battery assessment tools in communication with a fleet management system according to some embodiments of the present disclosure.

In some embodiments, the impedance spectroscopy measurements described above are used in combination with data from one or more other types of measurements to assess battery health and remaining useful life. FIG. 3 is a block diagram illustrating a set of battery assessment tools for assessing the EV fleet that are in communication with the fleet management system 120. In this example, a second embodiment of a battery assessment station 300 includes an impedance spectroscopy device 310, an impedance spectroscopy analyzer 320, an acoustic measurement device 330, an acoustic signal analyzer 340, a station controller 350, and communications circuitry 360. The EV 110 includes on-board sensors 370. The set of fleet battery assessment tools also includes a Coulomb counter station 380. In alternative configurations, different and/or additional components may be included, e.g., more or fewer battery assessment tools may be used.

The impedance spectroscopy device 310 is similar to the impedance spectroscopy device 210 described with respect to FIG. 2. The impedance spectroscopy analyzer 320 is similar to the battery analyzer 250 described with respect to FIG. 2.

In this example, the battery assessment station 300 further includes an acoustic measurement device 330 and an acoustic signal analyzer 340. The acoustic measurement device 330 propagates acoustic signals (e.g., sound waves or ultrasonic waves) through the battery 150 and measures the acoustic signal that passes through the battery 150, e.g., a reflection of the propagated signal. Different interfaces within the battery 150 reflect the acoustic signal, and the sensed acoustic signal provides information about the interfaces within the battery 150 and changes to material properties within the battery. In particular, the time-of-flight and amplitude of the returned signal can be used to analyze battery performance.

The acoustic measurement device 330 may generate an acoustic signal that is applied by the cord and plug shown in FIG. 1 to the battery 150, e.g., the plug includes an ultrasonic transducer that sends a compressional pulse into the battery 150. In other embodiments, a transducer separate from the plug and cord shown in FIG. 1 is applied or attached to the battery 150, e.g., to a battery access in the underside of the EV 110. In some embodiments, the same transducer that applies the acoustic signal is used to measure an echo signal. In other embodiments, a first transducer sends an ultrasonic signal through the battery 150 and one or more additional transducers at other parts of the battery 150 measure the signal that has propagated through the battery 150.

The acoustic signal analyzer 340 receives the measured acoustic data from the acoustic measurement device 330. The acoustic signal analyzer 340 processes the measured acoustic data to calculate a battery parameter or set of parameters that describe the battery 150. Battery parameters may characterize the response of the battery 150 to the acoustic signal, e.g., the parameters may include a maximum amplitude of the first echo signal received at the transducer and a time-of-flight (TOF) for the first echo signal to traverse the battery 150 and return to the transducer. Battery parameters may alternately or additionally include parameters describing battery characteristics, such as battery capacity, remaining useful life, and/or SoH. The acoustic signal analyzer 340 may store a machine-learned battery model that is configured to calculate one or more battery parameters from the acoustic data. An example of the battery model is described with respect to FIG. 5.

The station controller 350 controls the impedance spectroscopy device 310, the impedance spectroscopy analyzer 320, the acoustic measurement device 330, and the acoustic signal analyzer 340. For example, the station controller 350 instructs the impedance spectroscopy device 310 to apply the electrical stimulus signal, collect measurement data, and provide the measurement data to the impedance spectroscopy analyzer 320. The station controller 350 receives battery parameters from the impedance spectroscopy analyzer 320 and transmits the battery parameters to the communications circuitry 360, which transmits the battery parameters to the fleet management system 120, as described above. Similarly, the station controller 350 instructs the acoustic measurement device 330 to apply an acoustic signal, collect measurement data, and provide the measurement data to the acoustic signal analyzer 340. The station controller 350 receives battery parameters from the acoustic signal analyzer 340 and transmits the battery parameters to the communications circuitry 360, which transmits the battery parameters to the fleet management system 120. In some embodiments, the battery assessment station 300 includes separate controllers for the impedance spectroscopy components 310 and 320 and the acoustic components 330 and 340.

The battery assessment station 300 shown in FIG. 3 is merely exemplary. In some embodiments, the fleet battery assessment tools include acoustic measurement stations that are separate from the impedance spectroscopy stations. In some embodiments, additional measurement systems or sensors are included in the battery assessment station 300, e.g., a Coulomb counter station 380 (described below) may be incorporated into the battery assessment station 300. In some embodiments, the battery assessment station 300 includes environmental sensors, e.g., temperature and humidity sensors, to collect data that may impact the impedance spectroscopy and/or acoustic test results. In some embodiments, the battery assessment station 300 communicates with the EV 110 to obtain on-board measurements from on-board sensors 370, described below. In some embodiments, some or all of the components of the battery assessment station 300 are integrated into the EV 110. For example, the EV 110 may house one or more ultrasonic transducers that are coupled to the battery 150. The ultrasonic transducers may be controlled by an external battery assessment station 300, or other components of the acoustic assessment system (e.g., the acoustic signal analyzer 340 and the station controller 350) may be implemented on-board the EV 110.

The EV 110 includes a suite of on-board sensors 370 that measure electrical and environmental properties of the battery 150. For example, the on-board sensors 370 may include one or more current sensors, voltage sensors, temperature sensors, pressure sensors, humidity sensors, or other types of sensors. The EV 110 is in communication with the fleet management system 120 and transmits data from the on-board sensors 370 to the fleet management system 120. Alternatively or in addition, the EV 110 may transmit data from the on-board sensors 370 to other measurement systems, such as the battery assessment station 300, as mentioned above. Measurements obtained by the on-board sensors 370 may be used to improve understanding of the health of the battery 150. For example, impedance and acoustic properties of the battery 150 are temperature-dependent, so temperature data from the on-board sensors 370 may be used as an input to a battery model for assessing the battery 150. As another example, measurements from the on-board sensors 370 may be useful in determining a cause of battery degradation, e.g., an increase in pressure suggests that the battery 150 is outgassing.

In some embodiments, the fleet battery assessment tools include a Coulomb counter station 380. The Coulomb counter station 380 charges and discharges the battery 150 while accurately measuring the current input during charging and current output during discharging. As noted above, Coulomb counting is a slow process that degrades the battery if used repeatedly, so it is not suitable for frequent use. However, Coulomb counting may be used occasionally in the fleet battery assessment system. In particular, the Coulomb counter station 380 may provide accurate SoH data that is used to develop models for estimating battery SoH based on other measurements that are more easily obtained, e.g., impedance spectroscopy measurements, acoustic measurements, and/or on-board measurements. In addition, Coulomb counting may be performed occasionally (e.g., monthly or quarterly) to obtain a highly accurate SoH data point.

Example Fleet Management System

Figure 4:
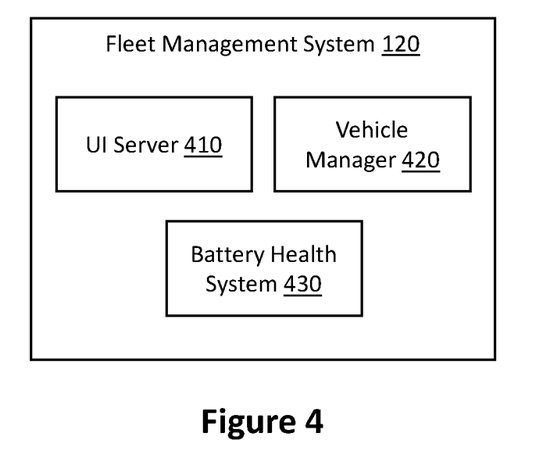
FIG. 4 is a block diagram illustrating an example fleet management system according to some embodiments of the present disclosure.

FIG. 4 is a block diagram illustrating the fleet management system 120 according to some embodiments of the present disclosure. The fleet management system 120 includes a UI (user interface) server 410, a vehicle manager 420, and a battery health system 430. In alternative configurations, different and/or additional components may be included in the fleet management system 120. Further, functionality attributed to one component of the fleet management system 120 may be accomplished by a different component included in the fleet management system 120 or a different system than those illustrated.

The UI server 410 is configured to communicate with client devices that provide a user interface to users. For example, the UI server 410 may be a web server that provides a browser-based application to client devices, or the UI server 410 may be a mobile app server that interfaces with a mobile app installed on client devices. The user interface enables the user to access a service of the fleet management system 120, e.g., to request a ride from an EV 110, or to request a delivery from an EV 110.

The vehicle manager 420 manages and communicates with a fleet of EVs, including EVs 110a through 110N. The vehicle manager 420 may assign EVs 110 to various tasks and direct the movements of the EVs 110 in the fleet. For example, the vehicle manager 420 assigns an EV 110 to perform a service requested by a user through the UI server 410. The vehicle manager 420 may instruct EVs 110 to drive to other locations while not servicing a user, e.g., to improve geographic distribution of the fleet, to anticipate demand at particular locations, to drive to a charging station for charging, to drive to a battery assessment station 130 to assess battery health, etc. The vehicle manager 420 also instructs EVs 110 to return to EV facilities for recharging, maintenance, or storage. When assigning the EV 110 to perform tasks, such as autonomous driving and recharging at a charging station, the vehicle manager 420 implements the operational rules set by the battery health system 430. For example, the battery health system 430 may set a rule for an EV 110 to charge at a certain rate, or to a certain charge bound, in order to preserve battery life. As another example, the battery health system 430 may set a rule for an EV 110 to not travel beyond a certain range based on current SoH of the battery. The operational rules implemented by the vehicle manager 420 are described further in relation to FIG. 5

The battery health system 430 assesses the health of batteries in the fleet of EVs 110 and manages battery usage. The battery health system 430 interacts with a set of connected battery assessment stations, such as battery assessment station 130 or 300. The battery health system 430 may further interact with other battery measurement devices, such as the on-board sensors 370 and Coulomb counter station 380. In some embodiments, the battery health system 430 processes data received from the battery assessment stations and, in some embodiments, other measurement devices to determine one or more battery parameters describing the health of batteries in the fleet. In some embodiments, the battery health system 430 processes the battery parameters to determine one or more potential causes of battery degradation. In other embodiments, the parameters are calculated at the battery assessment station 130, which, in some embodiments, further determines potential causes of battery degradation. The battery health system 430 can perform battery planning and management. In particular, the battery health system 430 may set operational rules for a battery 150 based on the parameter(s) and/or cause(s) of degradation. The battery health system 430 is described further in relation to FIG. 5.

Example Battery Health System

Figure 5:
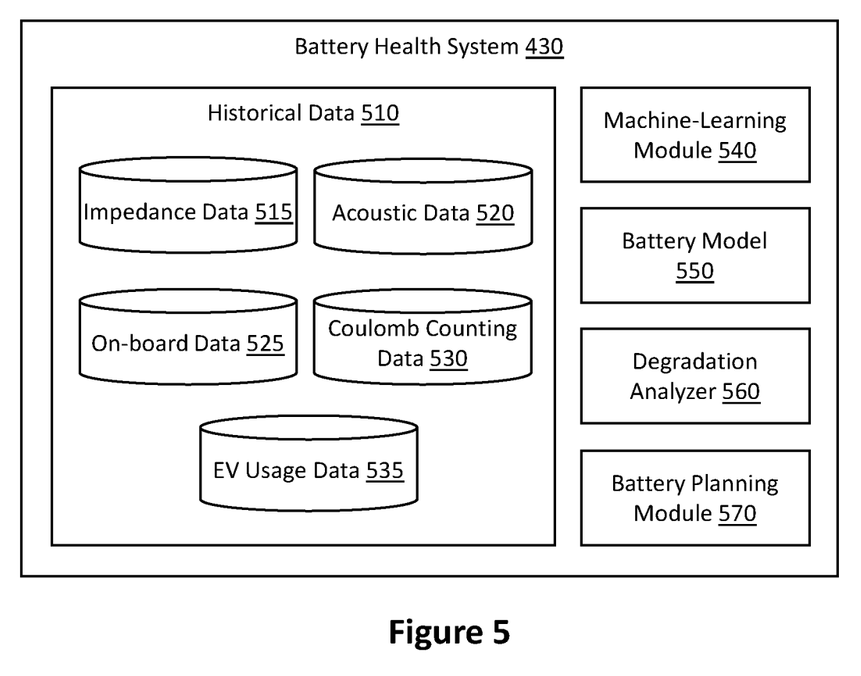
FIG. 5 is a block diagram illustrating an example battery health system according to some embodiments of the present disclosure.

FIG. 5 is a block diagram illustrating the battery health system 430 according to some embodiments of the present disclosure. The battery health system 430 includes historical data 510, a machine-learning module 540, a battery model 550, a degradation analyzer 560, and a battery planning module 570. In alternative configurations, different and/or additional components may be included in the battery health system 430. For example, in some embodiments, the battery analyzer 250, impedance spectroscopy analyzer 320, and/or acoustic signal analyzer 340 are implemented at the battery health system 430. Further, functionality attributed to one component of the battery health system 430 may be accomplished by a different component included in the battery health system 430 or a different system than those illustrated.

The historical data 510 includes data obtained by battery analysis stations and sensors that can be used to train one or more models for understanding battery health. In the example shown in FIG. 5, the historical data 510 includes impedance data 515, acoustic data 520, on-board data 525, Coulomb counting data 530, and EV usage data 535. In alternative configurations, different, fewer, and/or additional data sets may be included in the historical data 510, based on which sensors and assessment systems are used by the fleet management system 120.

The impedance data 515 is data obtained from impedance spectroscopy systems, such as the battery assessment station 130 or 300. The acoustic data 520 is data obtained from acoustic assessment systems, such as the battery assessment station 300. The on-board data 525 is obtained from on-board battery sensors, such as the on-board sensors 370. The Coulomb counting data 530 is obtained from Coulomb counting systems, such as the Coulomb counter station 380. Each of these data sets is obtained from a sample of EV batteries across a range of battery conditions. For example, a test set of EVs (e.g., a portion of the EV fleet 110 or all of the EVs 110 in a fleet) can undergo battery testing over the lifetimes of their batteries, using any or all of the analysis stations and systems described above. The battery health system 430 collects impedance data 515, acoustic data 520, on-board data 525, and/or Coulomb counting data 530 periodically over the course of the batteries' lifetimes.

In addition, the battery health system 430 collects EV usage data 535 describing usage of the batteries, such number of charge/discharge cycles, charging rates (e.g., an average charge rate, a maximum charge rate, etc.), a discharge rate (e.g., an average discharge rate, a maximum discharge rate), miles traveled between charges, speed of travel (e.g., average speed, ratio of highway driving to city driving), etc. The EV usage data 535 may also include environmental factors that can have an impact on battery health, such as temperature, humidity, type of terrain traveled by the EV (e.g., mountainous or flat), etc. The EV usage data 535 may also include battery failure events, such as rapid capacity degradation events, and when the battery was replaced (indicating the end of the battery's useful life). In some embodiments, the EV usage data 535 includes data describing the presence of and/or amount of degradation factors, such as lithium plating, SEI layer growth, or active material loss.

The machine-learning module 540 process the historical data 510 to develop one or more machine-learning models, such as the battery model 550. More particularly, the machine-learning module 540 uses machine learning to identify a set of features that can be used to predict a particular battery characteristic, such as battery capacity, remaining useful life, SoH, and time to reach a full charge. For example, the machine-learning module 540 processes impedance data 515 to identify a set of stimulus frequencies that are useful for predicting a battery's SoH. As another example, the machine-learning module 540 processes acoustic data 520 to identify characteristics in the acoustic measurements that are useful for predicting a battery's SoH. The machine-learning module 540 further determines a relationship between the set of features (e.g., the impedance measurements obtained in response to applying a stimulus signal at the identified set of frequencies) and the battery characteristic (e.g., the predicted SoH). The machine-learning module 540 may use any known machine learning algorithm or combination of algorithms, such as Gaussian process regression (GPR), other Bayesian learning methods, support-vector machines (SVM), artificial neural networks, etc., to training the battery model 550.

The machine-learning module 540 may develop multiple models for predicting different battery characteristics, e.g., one model to predict remaining useful life, and another model to predict SoH. Each model may be based on one or more of the historical data sets 510. In some embodiments, the machine-learning module 540 generates different models that based on battery type and/or usage. For example, batteries of EVs 110 in a hilly city with harsh winters may behave considerably differently from batteries of EVs 110 in a flat desert environment. Accordingly, the machine-learning module 540 develops different models or sets of models that apply to different cities, regions, or climates. As another example, a battery that routinely receives a DC fast charge may degrade differently from a battery that usually receives a slower DC or AC charge and the machine-learning module 540 may develop different models or sets of models that apply to batteries charged by types of charging stations. In other embodiments, some or all of these aspects are incorporated as features in a model. For example, a neural network may take temperature data, terrain data, and/or charging data as input features and predict a battery characteristic based on part on these features.

The battery model 550 predicts a battery characteristic based on the features determined to be predictive by the machine-learning module 540. As discussed above, in some embodiments, the battery model 550 is transmitted from the fleet management system 120 to battery assessment stations (e.g., battery assessment station 130 or 300). In other embodiments, the battery health system 430 uses the battery model 550 to compute a battery characteristic based on data received from a battery assessment station and/or other sources.

The degradation analyzer 560 predicts a mechanism of degradation based on one or more battery parameters and/or other data. For example, the degradation analyzer 560 receives a parameter indicating the SoH of a battery 150 calculated using the battery model 550. The degradation analyzer 560 may receive additional data about the battery 150, such as the age of the battery, number of charge/discharge cycles, environmental data, etc. The degradation analyzer 560 may apply rules or another machine-learned model to predict a mechanism of degradation based on the input data. As an example, the EV usage data 535 includes historical data describing observed mechanisms of degradation for some sample batteries. The machine-learning module 540 may develop a machine-learned classification model trained to classify a degradation mechanism based on other data that can be routinely obtained, such as impedance data 515.

The battery planning module 570 sets operational rules for a battery 150 based on the parameter(s) and/or cause(s) of degradation determined by the battery model 550 and/or degradation analyzer 560. The operational rules may include rules related to charging rate, e.g., a battery should not receive a charge at a rate above 200 kW or above 50 kW, or a battery should only receive AC charge (which is typically slower than DC). For example, the battery planning module 570 sets an operational rule to use a slower charging rate when the degradation analyzer 560 determines that the battery has a certain amount of SEI layer growth. The vehicle manager 420 can instruct the EV 110 to recharge at suitable charging stations (e.g., avoiding DC fast charging stations), or instruct the EV 110 to request power from a charging station at the specified rate.

The operational rules may include rules relating to charge bounds, e.g., an upper charge bound that sets a maximum charging level, e.g., 70% or 80% of the battery's capacity, or lower charge bound that sets a minimum charge level that the battery should not dip below, e.g., 20% or 10% of the battery's capacity. Setting upper charge bounds and lower charge bounds can lengthen a battery lifetime. Furthermore, setting a lower charge bound may be used to avoid rapid capacity degradation. For example, the battery planning module 570 sets an operational rule to implement charging bounds when the degradation analyzer 560 determines that the battery has a certain amount of lithium plating. The vehicle manager 420 can instruct the EV 110 to request power from a charging station up to an upper charge bound, and to autonomously drive to a charging station when the EV 110 is nearing a lower charge bound.

Other operational rules may involve environmental conditions such as operating temperatures, e.g., only using an EV 110 when the ambient temperature is below 85° F. or above 30° F. The vehicle manager 420 may access local weather data and assign the EV 110 to tasks when the weather data meets the environmental conditions. Still other operational rules may involve power draw, e.g., only drawing power at a rate below an average of 10 kW or 15 kW. The vehicle manager 420 may apply power draw rules in various ways, e.g., by reducing or eliminating HVAC (heating, ventilation, and air conditioning) use, by avoiding high speeds (e.g., avoiding highways), avoiding hills, etc.

Yet another operational rule includes assigning the EV to tasks that fall within the mileage range of the EV. For example, the battery planning module 570 determines a mileage range that corresponds to a measured capacity of the battery 150. The vehicle manager 420 assigns the EV to tasks that ensure that the EV can reach a charging station before the battery runs out of power, or before the battery level falls below a lower charge bound, as described above. The battery planning module 570 may set the mileage range more conservatively as the battery 150 degrades, as a more degraded battery may be more prone to rapid capacity degradation.

The battery planning module 570 may assist in fleet-level procurement and maintenance planning. In particular, the battery planning module 570 may determine when each battery should be replaced or is expected to need replacing based on a calculated remaining useful life for the battery. The battery planning module 570 may interface with a fleet procurement system to ensure that a sufficient number of replacement batteries are available in a given location in time for the replacement, and help coordinate maintenance staffing to ensure that new batteries can be swapped in.

In some embodiments, the fleet management system 120 applies different test conditions to sets of batteries to develop the operational rules. For example, the fleet management system 120 assigns one set of EVs 110 to charge their batteries up to 60% of capacity, another set of EVs 110 to charge their batteries up to 80% of capacity, and another set of EVs 110 to charge their batteries 100% of capacity. The battery health system 430 collects historical data over the course of these batteries lifetimes to determine one or more conditions under which applying a particular charge bound provides a benefit to the battery health (and in particular, a benefit that outweighs the fleet management impact of not fully charging a battery).

Example Processes for Assessing a Battery and Adjusting Battery Usage

Figure 6:
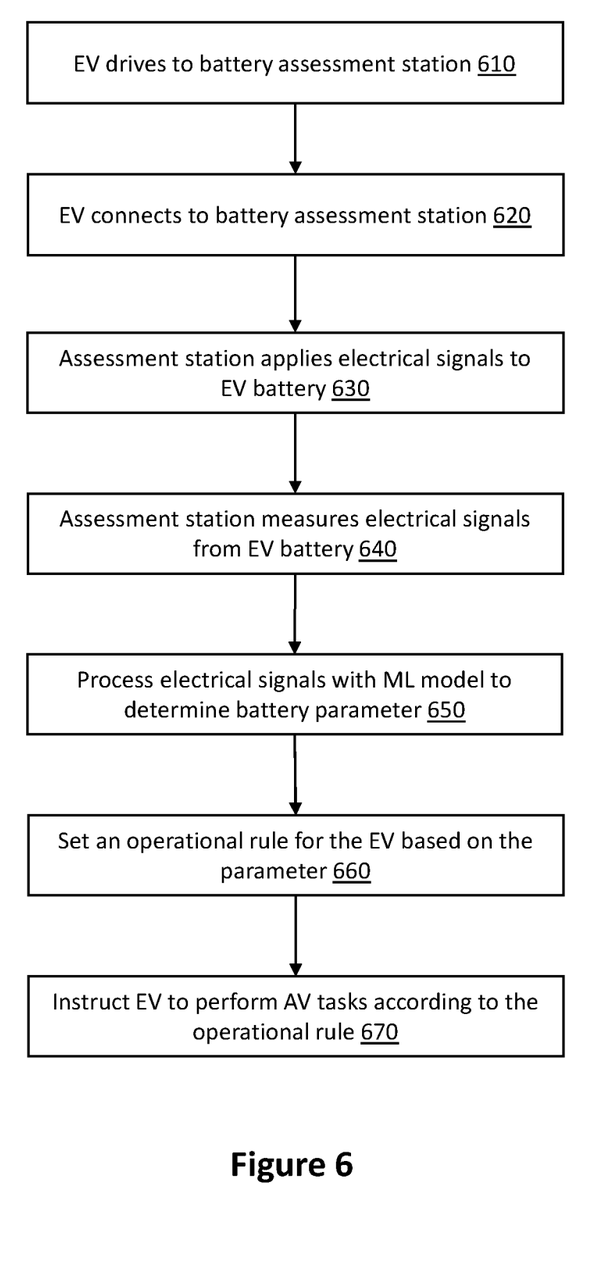
FIG. 6 is a flowchart showing a process for assessing an EV battery and adjusting operation of the EV based on its battery assessment according to some embodiments of the present disclosure.

FIG. 6 is a flowchart showing a process for assessing an EV battery and adjusting operation of the EV based on its battery assessment. An EV, such as EV 110, drives 610 to a battery assessment station, such as battery assessment station 130 or 300. The EV 110 connects 620 to the battery assessment station with the cord and plug shown in FIG. 1, or by another connection or set of connections. In some embodiments, the EV 110 can connect to the battery assessment station autonomously, or the battery assessment station can connect to the EV 110 autonomously, e.g., using a mechanical arm. In other embodiments, the EV 110 is manually connected to the battery assessment station by a human operator.

The assessment station applies 630 electrical signals to the EV battery 150. For example, the assessment station applies a set of electrical stimulus signals at a set of frequencies selected by a battery health system 430. The assessment station measures 640 electrical signals from the EV battery 150, e.g., signals indicating an impedance response of the battery 150 to the electrical stimulus signals. In alternative embodiments, the assessment station applies and measures acoustic signals, either instead of or in addition to the electrical signals.

The assessment station or a battery health system processes 650 the electrical signals or data derived from the electrical signals using a machine-learned model to determine one or more battery parameters. The machine-learned model is trained by the battery health system 430 to estimate battery parameters based on historical battery data, as described in relation to FIG. 5.

The battery health system sets 660 an operational rule for the EV 110 based on the battery parameter or parameters. The fleet management system 120 instructs the EV 110 to perform tasks, such as autonomous driving and recharging tasks, according to the operational rule. Example operational rules and implementation of the operational rules are described in relation to FIG. 5.

SELECT EXAMPLES

Example 1 provides a system for assessing battery health of a battery-powered EV that includes a battery analyzer, a battery planning module, and a vehicle manager. The battery analyzer is configured to receive data generated by an impedance spectroscopy device at a battery assessment station and determine at least one parameter describing the battery based on the received data, the at least one parameter determined using a machine-learned model trained using battery assessment data obtained from a plurality of EV batteries. The battery planning module is configured to set an operational rule for the EV based on the at least one parameter determined by the battery analyzer. The vehicle manager is configured to instruct the EV to perform autonomous driving tasks, the vehicle manager configured to instruct the EV according to the operational rule.

Example 2 provides the system according to example 1, where the impedance spectroscopy device is configured to supply an electrical stimulus including a plurality of electrical signals at a corresponding plurality of frequencies, and to measure electrical signals generated by the battery in response to the electrical stimulus.

Example 3 provides the system according to example 1 or example 2, where the battery analyzer is implemented by the battery assessment station, and the battery assessment station includes communications circuitry configured to transmit the at least one parameter to a fleet management system implementing the battery planning module and the vehicle manager.

Example 4 provides the system according to any of the preceding examples, where the battery analyzer is further configured to receive on-board sensor data describing the battery from a measurement system on-board the EV and determine the at least one parameter describing the battery further based on the on-board sensor data.

Example 5 provides the system according to any of the preceding examples, where the battery analyzer is further configured to receive acoustic sensor data describing an acoustic signal propagated through the battery from an acoustic sensor and determine the at least one parameter describing the battery further based on the acoustic sensor data.

Example 6 provides the system according any of the preceding examples, where determining the system further includes a degradation analyzer configured to determine a cause of battery degradation based on the at least one battery parameter, and where the battery planning module is configured to set the operational rule for the EV based on the cause of battery degradation.

Example 7 provides the system according to any of examples 1 through 5, where the operational rule is related to at least one of an upper charge bound and a lower charge bound for the battery, where the upper charge bound is a maximum charging level for charging the battery less than a full charge, and the lower charge bound is a minimum charge level greater than zero charge at which the fleet management system instructs the EV to recharge its battery.

Example 8 provides the system according to any examples 1 through 5, where the operational rule is related to operation of the EV in an environmental condition, and the vehicle manager is configured to instruct the EV to drive when the environmental condition is present.

Example 9 provides the system according to any examples 1 through 5, where the operational rule is a maximum charging rate for the EV, and the vehicle manager is configured to instruct the EV to autonomously drive to a charging station configured to deliver charge at or below the maximum charging rate.

Example 10 provides the system according to any examples 1 through 5, where the operational rule is a maximum rate of power draw for the EV to draw power from the battery, and the vehicle manager is configured to instruct the EV to operate in a manner that is expected to draw power at a rate below the maximum rate of power draw.

Example 11 provides a system for assessing battery health of a battery-powered EV that includes a plurality of battery assessment stations and a fleet management system. Each battery assessment station includes a battery connection configured to electrically couple the battery assessment station to the battery of the EV, a stimulus generator configured to apply an electrical stimulus to the battery of the EV through the battery connection, an impedance sensor configured to measure an impedance response of the battery to the electrical stimulus, and communications circuitry configured to transmit data based on the measured impedance response. The fleet management system is configured to instruct the EV to autonomously maneuver to a selected one of the plurality of battery assessment stations for battery assessment; receive, from the selected battery assessment station, data based on the measured impedance response of the battery; and set an operational rule for the EV based on the data.

Example 12 provides the system according to example 11, where each battery assessment station further includes a charging module configured to charge the battery through the battery connection.

Example 13 provides the system according example 11 or 12, where each battery assessment station further includes a battery analyzer configured to determine at least one parameter describing the battery based on the measured impedance response, the at least one parameter determined using a machine-learned model trained by the fleet management system using battery assessment data obtained from a plurality of EV batteries.

Example 14 provides the system according to any of examples 11 through 13, where the fleet management system includes a vehicle manager configured to instruct the EV to perform autonomous driving tasks, the vehicle manager configured to instruct the EV according to the operational rule.

Example 15 the system according to any of examples 11 through 14, where the electrical stimulus includes a plurality of electrical signals at a corresponding plurality of frequencies, and the impedance sensor is configured to measure the impedance response of the battery to the electrical stimulus at each of the plurality of frequencies.

Example 16 provides a method for assessing an EV battery and adjusting operation of the EV that includes receiving data generated by an impedance spectroscopy device at a battery assessment station, the data describing an impedance response of the battery to an electrical stimulus; determining at least one parameter describing the battery based on the received data, the at least one parameter determined using a machine-learned model trained using battery assessment data obtained from a plurality of EV batteries; setting an operational rule for the EV based on the at least one parameter; and instructing the EV to perform an autonomous driving according to the operational rule.

Example 17 provides the method according to example 16, further including instructing the EV to autonomously drive to the battery assessment station.

Example 18 provides the method according to example 16 or 17, further including applying an electrical stimulus including a plurality of electrical signals at a corresponding plurality of frequencies to the battery; measuring electrical signals generated by the battery in response to the electrical stimulus at each of the plurality of frequencies; and deriving the data describing the impedance response of the battery from the measured electrical signals.

Example 19 provides the method according to any of examples 16 through 18, further including receiving acoustic sensor data describing an acoustic signal propagated through the battery from an acoustic sensor; and determining the at least one parameter describing the battery further based on the acoustic sensor data.

Example 20 provides the method according to any of examples 16 through 19, further including determining a cause of battery degradation based on the at least one battery parameter, where the operational rule for the EV is based on the cause of battery degradation.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A system for assessing battery health of a battery-powered electric vehicle (EV), the system comprising:
    at least one computer processor for executing computer program instructions; and
    at least one computer-readable memory storing computer program instructions executable by the at least one computer processor to perform operations comprising:
        receiving data describing a battery of the EV, the data generated by an impedance spectroscopy device at a battery assessment station;
        determining at least one parameter describing the battery based on the received data, the at least one parameter determined using a machine-learned model trained using battery assessment data obtained from a plurality of EV batteries;
        setting an operational rule for the EV based on the at least one parameter; and
        instructing the EV to perform autonomous driving tasks according to the operational rule.

2. The system of claim 1, further comprising the impedance spectroscopy device, wherein the impedance spectroscopy device is to supply an electrical stimulus comprising a plurality of electrical signals at a corresponding plurality of frequencies, and to measure electrical signals generated by the battery in response to the electrical stimulus.

3. The system of claim 1, wherein the battery assessment station comprises a computer processor to determine the at least one parameter describing the battery based on the received data, and the battery assessment station further comprises communications circuitry to transmit the at least one parameter to a fleet management system.

4. The system of claim 1, wherein the operations further comprise:
    receiving on-board sensor data describing the battery from a measurement system on-board the EV; and
    determining the at least one parameter describing the battery further based on the on-board sensor data.

5. The system of claim 1, wherein the operations further comprise:
    receiving acoustic sensor data describing an acoustic signal propagated through the battery from an acoustic sensor; and
    determining the at least one parameter describing the battery further based on the acoustic sensor data.

6. The system of claim 1, wherein the operations further comprise:
    determining a cause of battery degradation based on the at least one parameter; and
    setting the operational rule for the EV based on the cause of battery degradation.

7. The system of claim 1, wherein the operational rule comprises a rule related to at least one of an upper charge bound and a lower charge bound for the battery, the upper charge bound comprising a maximum charging level for charging the battery less than a full charge, and the lower charge bound comprising a minimum charge level greater than zero charge at which the EV is instructed to recharge its battery.

8. The system of claim 1, wherein the operational rule comprises a rule related to operation of the EV in an environmental condition, and the EV is instructed to drive when the environmental condition is present.

9. The system of claim 1, wherein the operational rule comprises a maximum charging rate for the EV, and the EV is instructed to autonomously drive to a charging station configured to deliver charge at or below the maximum charging rate.

10. The system of claim 1, wherein the operational rule comprises a maximum rate of power draw for the EV to draw power from the battery, and the EV is instructed to operate in a manner that is expected to draw power at a rate below the maximum rate of power draw.

11. A system for assessing battery health of a battery-powered electric vehicle (EV), the system comprising:
   a plurality of battery assessment stations, each battery assessment station comprising:
      a battery connection to electrically couple the battery assessment station to a battery of an EV;
      a stimulus generator to apply an electrical stimulus to the battery of the EV through the battery connection; and
      a sensor to measure an impedance response of the battery to the electrical stimulus; and
   one or more computer-readable media storing instructions executable to perform operations, the operations comprising:
      instructing the EV to autonomously maneuver to a selected one of the plurality of battery assessment stations for battery assessment;
      receiving, from the selected battery assessment station, data based on the measured impedance response of the battery; and
      setting an operational rule for the EV based on the data.

12. The system of claim 11, wherein each battery assessment station further comprises a charging module configured to charge the battery through the battery connection.

13. The system of claim 11, wherein each battery assessment station further comprises a battery analyzer to determine at least one parameter describing the battery based on the measured impedance response, the at least one parameter determined using a machine-learned model trained by the fleet management system using battery assessment data obtained from a plurality of EV batteries.

14. The system of claim 11, the operations further comprising instructing the EV to perform autonomous driving tasks according to the operational rule.

15. The system of claim 11, wherein the electrical stimulus comprises a plurality of electrical signals at a corresponding plurality of frequencies, and the sensor is to measure the impedance response of the battery to the electrical stimulus at each of the plurality of frequencies.

16. A method for assessing an electric vehicle (EV) battery and adjusting operation of the EV comprising:
   receiving data generated by an impedance spectroscopy device at a battery assessment station, the data describing an impedance response of the battery to an electrical stimulus;
   determining at least one parameter describing the battery based on the received data, the at least one parameter determined using a machine-learned model trained using battery assessment data obtained from a plurality of EV batteries;
   setting an operational rule for the EV based on the at least one parameter; and
   instructing the EV to perform an autonomous driving task according to the operational rule.

17. The method of claim 16, further comprising instructing the EV to autonomously drive to the battery assessment station.

18. The method of claim 16, further comprising:
   applying an electrical stimulus comprising a plurality of electrical signals at a corresponding plurality of frequencies to the battery;
   measuring electrical signals generated by the battery in response to the electrical stimulus at each of the plurality of frequencies; and
   deriving the data describing the impedance response of the battery from the measured electrical signals.

19. The method of claim 16, further comprising:
   receiving acoustic sensor data describing an acoustic signal propagated through the battery from an acoustic sensor; and
   determining the at least one parameter describing the battery further based on the acoustic sensor data.

20. The method of claim 16, further comprising determining a cause of battery degradation based on the at least one parameter, wherein the operational rule for the EV is based on the cause of battery degradation.

* * * * *